United States Patent
Pedersen et al.

(10) Patent No.: US 9,405,720 B2
(45) Date of Patent: Aug. 2, 2016

(54) MANAGING WAIT STATES FOR MEMORY ACCESS

(71) Applicant: Atmel Corporation, San Jose, CA (US)

(72) Inventors: Frode Milch Pedersen, Trondheim (NO); Sebastien Jouin, LaChapell-Launay (FR); Ian Fullerton, Tanem (NO)

(73) Assignee: Atmel Corporation, San Jose, CA (US)

( * ) Notice: Subject to any disclaimer, the term of this patent is extended or adjusted under 35 U.S.C. 154(b) by 165 days.

(21) Appl. No.: 13/941,671

(22) Filed: Jul. 15, 2013

(65) Prior Publication Data
US 2014/0281156 A1    Sep. 18, 2014

Related U.S. Application Data

(60) Provisional application No. 61/790,421, filed on Mar. 15, 2013.

(51) Int. Cl.
*G06F 13/42* (2006.01)
*G06F 13/16* (2006.01)

(52) U.S. Cl.
CPC ........ *G06F 13/4217* (2013.01); *G06F 13/1689* (2013.01); *G06F 13/4243* (2013.01)

(58) Field of Classification Search
CPC ............ G06F 13/4234; G06F 13/4217; G06F 13/1689; G06F 13/4243; G06F 13/4291
See application file for complete search history.

(56) References Cited

U.S. PATENT DOCUMENTS

| | | | | |
|---|---|---|---|---|
| 5,125,088 A | * | 6/1992 | Culley | 713/400 |
| 5,201,036 A | * | 4/1993 | Yoshimatsu | 710/107 |
| 5,854,944 A | * | 12/1998 | Catherwood et al. | 710/59 |
| 6,356,987 B1 | * | 3/2002 | Aulas | 711/167 |
| 2002/0184420 A1 | * | 12/2002 | Maone et al. | 710/105 |
| 2005/0060594 A1 | * | 3/2005 | Barr et al. | 713/600 |

* cited by examiner

*Primary Examiner* — Mardochee Chery
*Assistant Examiner* — William E Baughman
(74) *Attorney, Agent, or Firm* — Fish & Richardson P.C.

(57) ABSTRACT

A latch signal is received from a non-volatile memory device that is indicative of a current access time for the non-volatile memory device. The access time represents an amount of time required for the non-volatile memory device to make data available responsive to a request for data. A bus system clock signal is received. The latch signal is evaluated and a wait state for the non-volatile memory device is adjusted based on the evaluation. The wait state represents a number of cycles of the bus system clock used by a central processing unit for an access of the non-volatile memory device. A bus system data ready signal that is triggered based on the adjusted wait state is produced. The bus system data ready signal, when triggered, indicates that data is available responsive to the request.

26 Claims, 4 Drawing Sheets

MANAGING WAIT STATES FOR MEMORY ACCESS

CLAIM OF PRIORITY

This application claims priority under 35 USC §119(e) to U.S. Provisional Application Ser. No. 61/790,421, filed on Mar. 15, 2013, the entire contents of which are hereby incorporated by reference.

TECHNICAL FIELD

This disclosure relates to managing memory devices.

BACKGROUND

Some microcontroller systems include memory that can store executable instructions associated with one or more user applications. A central processing unit (CPU) can execute the instructions after reading them from the memory, so as to enable running of the user applications on a given device.

SUMMARY

In one aspect, a wait state associated with a non-volatile memory device is adjusted by receiving a latch signal from the non-volatile memory device that is indicative of a current access time for the non-volatile memory device. The access time represents an amount of time required for the non-volatile memory device to make data available responsive to a request for data. A bus system clock signal is received. The latch signal is evaluated and the wait state for the non-volatile memory device is adjusted based on the evaluation. The wait state represents a number of cycles of the bus system clock used by a central processing unit (CPU) for an access of the non-volatile memory device. A bus system data ready signal that is triggered based on the adjusted wait state is produced. The bus system data ready signal, when triggered, indicates that data is available responsive to the request.

Particular implementations may include one or more of the following features. Receiving a latch signal may include receiving the latch signal from the non-volatile memory device. A first edge of the latch signal may be indicative of a start time for processing the request and a second edge may be indicative of an end to the processing of the request and data being available responsive to the request.

The bus system clock signal may be received from the CPU. The bus system clock signal may vary over time depending on an application executed by the CPU.

Evaluating the latch signal may include evaluating a data ready edge of the latch signal. The wait state may be adjusted based on the evaluating including automatically increasing or decreasing the wait state and delaying or accelerating a triggering of the bus system data ready signal depending on a current access time associated with the non-volatile memory device.

The bus system clock signal may vary over time depending on an application executed by the CPU. The wait state adjustment may be independent of the frequency of the bus system clock signal.

Producing the bus system data ready signal may include triggering the bus system data ready signal a finite amount of time after receipt of a data ready edge of the latch signal. The finite amount of time may be based on the bus system clock signal. The bus system data ready signal may be triggered after elapse of a complete cycle of the bus system clock signal subsequent to the receipt of the data ready edge of the latch signal.

The access time may vary depending on one or more of temperature, voltage, process deviation or frequency of access. The latch signal may be synchronized to the bus system clock signal.

Implementations of the above techniques include a method, a system and a computer program product. The system comprises a non-volatile memory device that includes logic operable to perform one or more of the above described actions. The system also comprises a non-volatile memory device controller that includes logic operable to perform one or more of the above described actions.

The computer program product is suitably embodied in a non-transitory machine-readable medium and includes instructions executable by one or more processors. The instructions are configured to cause the one or more processors to perform the above described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference symbols in the various drawings indicate like elements.

DETAILED DESCRIPTION

Figure 1:
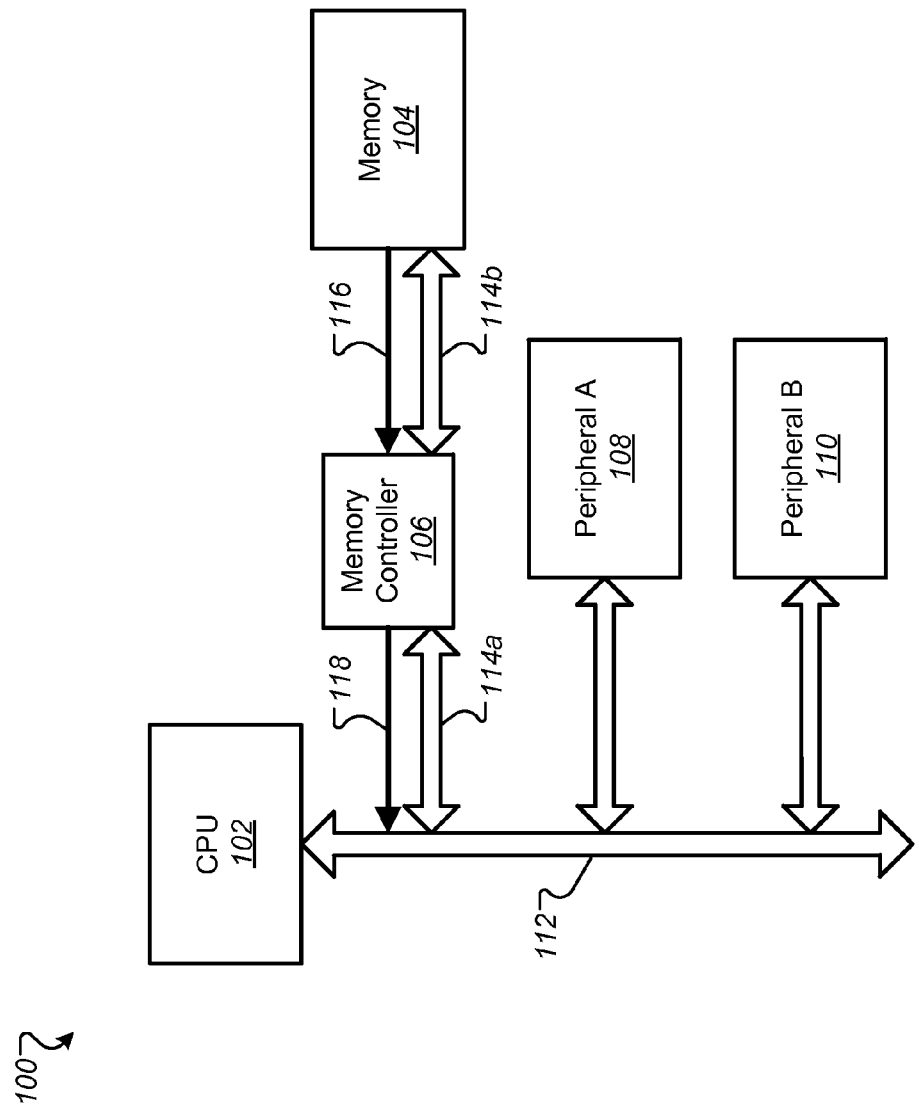
FIG. 1 is a block diagram of an example microcontroller that may be used for automatic wait state management.

In some microcontrollers, a non-volatile memory (NVM) stores the binary execution code of user applications. A CPU, for example, embedded in the microcontroller can access the information stored in the associated NVM through a system bus. The time taken by the CPU to access the information stored in the NVM is known as the access time, which may affect the performance of the underlying system or the microcontroller in general.

In some implementations, for a given access time, the CPU may access the NVM in one clock cycle of the system bus at a given maximum frequency, which is known as the "zero wait state max frequency." In some implementations, higher frequency may be achieved by configuring the CPU to access the NVM in two or more system bus clock cycles. The number of system bus clock cycles used by the CPU to access the NVM is referred to as the "wait state" of the CPU.

In some conventional systems, the wait state is a static number that can be configured in software. For example, the microcontroller user may write an appropriate value of the wait state number in a microcontroller register, which is referred to as the wait state configuration register. The CPU may thereafter be configured to access the memory based on the value in the register. A memory controller that manages access to the memory reads the value from the wait state configuration register and allows the CPU to access data from the memory, for example by signaling that the data is ready on the system bus, when the number of clock cycles corresponding to the wait state has elapsed.

A hard coded wait state may not reflect accurately situations where the system clock frequency (for example, CPU frequency) or application conditions, or both, change dynamically. In some implementations, it may be desirable for the power consumption of the microcontroller to be optimized by modifying the application configuration including modifying the system clock frequency up or down. In a conventional system, the wait state is not re-configurable (i.e., will remain fixed at the value stored in the wait state configuration register), thus causing potentially unnecessary delay in reading from the memory.

It may be useful to manage the configuration of the wait state automatically. When the conditions of the application change, or the CPU frequency, or both, the microcontroller system can automatically use the most efficient number of wait states for the CPU to access the NVM.

The following sections describe methods, devices and systems for automatically managing the wait states for a CPU to access the NVM in a microcontroller. The automatic configuration of the wait states may be achieved by using internal signals of the NVM to manage the memory access times by the CPU. Some implementations are transparent to the application and they do not use the wait state configuration register. A memory controller, which acts as the interface between the CPU and the NVM, monitors various conditions of the microcontroller and the application, such as the CPU frequency, output voltage, ambient temperature and the access time. Based on certain triggers, the memory controller dynamically adjusts the wait state for the CPU to access the NVM. In some implementations, the memory controller measures the memory access time based on a latch delay signal received from the NVM and compares the latch delay signal to the system bus clock cycle. The CPU's access to the memory can thereafter be controlled based on the results of the comparison. In some implementations, when the CPU frequency is substantially close to the access time, the number of the wait state is automatically updated.

Although the implementations are described in the following sections with respect to a non-volatile memory, the methods, devices and systems are equally applicable to any kind of memory or analog cell that provides data. For example, the methods, devices and systems are applicable to volatile memory, such as static or dynamic random access memory. The methods, devices and systems are also applicable to analog microcontroller peripheral devices, such as peripherals that depend on temperature and voltage, among other conditions.

FIG. 1 is a block diagram of an example microcontroller 100 that may be used for automatic wait state management. The microcontroller 100 includes a CPU 102 and memory 104 that interfaces with the CPU through the memory controller 106. The microcontroller 100 also includes peripheral devices, such as peripheral A 108 and peripheral B 110. The memory 104 and peripherals 108 and 110 are coupled to the CPU via the system bus 112. Address and data flow between the CPU 102 and the memory 104 using the address/data paths 114a and 114b. The memory 104 generates a latch delay signal 116, while the memory controller 106 generates a data ready signal 118.

In some implementations, the microcontroller 100 is a small computer on a single integrated circuit that includes a processor core (such as CPU 102), memory (such as memory 104), and programmable input/output peripherals (such as peripherals 108 and 110). The microcontroller may be used in automatically controlled products and devices, such as automobile engine control systems, implantable medical devices, remote controls, office machines, appliances, power tools, toys and other suitable systems.

The CPU 102 is configured for performing various operations such as input/output operations. The CPU 102 may include a digital processing element, or it may be a general purpose microprocessor.

The CPU 102 accesses information, such as binary code, for various applications that are stored in the memory 104 via the system bus 112 and performs the application operations by processing the information, such as by executing the binary code. To access information in the memory 104, the CPU 102 sends the address of the corresponding memory location to the memory controller 106 using system bus 112 and bus 114a. When the information is available, the CPU 102 receives the data ready signal 118 from the memory controller 106 and accordingly reads the information from the bus 114a.

In some implementations, the memory 104 is on-chip memory, for example, memory embedded in the microcontroller 100. In some implementations, the memory controller 106 and/or the CPU 102 may access the self-timing signals in the memory 104. In some implementations, the memory 104 may be non-volatile memory hardware, such as flash memory, or any other suitable storage mechanism that is configured for storing data in a persistent manner. As indicated previously, the memory 104 is used for storing information associated with user applications, such as application binary execution code.

In some implementations, the memory 104 provides the latch delay signal 116 to the memory controller 106. When a memory location is accessed, the memory 104 sets the latch delay signal to a first state (for example, a low level) for a time duration that is substantially equal to the access time. The time duration indicates the amount of time taken to read the data from the appropriate memory location of memory 104. In some implementations, the latch delay signal, and therefore the access time, is a function of the physical parameters of the flash memory die, and varies from device to device, such as due to variations in the silicon semiconductor material, environmental conditions such as the ambient temperature, the microcontroller voltage, and other parameters. When the data is ready, the memory 104 sets the latch delay signal 116 to a second state (for example, a high level).

In this context, the various signals are considered to have binary values, with the state of a signal set to either a first state or a second state. In the following description, the first state of a signal is described as corresponding to a low level, and the second state of a signal is described as corresponding to a high level. However, the description is equally applicable to implementations where the correspondence between the states of a signal and the signal level are reversed, or implementations where there exists some other suitable mapping between the states of a signal and the signal level.

The memory controller 106 may be of the form of a digital circuit that manages the flow of data to and from the memory 104. The memory controller 106 may be a separate integrated circuit, or it may be integrated into another chip, such as on the flash memory die of the memory 104, or on the CPU 102.

The memory controller 106 may include logic that is used to read from and write to the memory 104. The memory controller 106 receives a read enable signal from the CPU 102 and reads/passes a memory address using the system bus 112 and the bus114a. When the read enable signal is set, a memory address is available on the address bus. Upon reading the memory address from the address bus, the memory controller 106 can initiate a read of the information stored in the corresponding location in the memory 104.

The memory controller 106 provides the data ready signal 118 to the CPU 102. In some implementations, the data ready signal is triggered by the latch delay signal and the system clock. The memory controller 106 receives the latch delay signal 116 from the memory 104. When the latch delay signal is determined to be in the first state (for example, low level), the memory controller 106 sets the data ready signal 118 to the first state (for example, also a low level), indicating that the data requested by the CPU 102 is being retrieved from the memory and that the data is not yet available.

The latch delay signal 116 is produced by the memory 104 and is used to set the wait state. In the first state, the latch delay signal indicates to the memory controller 106 that the memory is busy accessing the data. In the second state (for example, high level), the latch delay signal indicates to the memory controller 106 that the data is ready and can be transferred to the CPU.

In some implementations, the memory controller 106 captures the latch delay signal 116 every time the system bus clock enters the first state (for example, low level). In some implementations, the memory controller 105 waits for a full clock cycle of the system bus before updating the data ready signal 118, which allows the system to settle to a steady state. In some implementations, when the captured latch delay signal 116 is in the second state (for example, high level), the memory controller 106 waits until the system bus clock 112 makes a transition from the first state to the second state before setting the data ready signal 118 to the second state (for example, also a high level), indicating to the CPU that the requested data is available on the system bus. The CPU 102 may then read the data via the system bus 112. This ensures that the data on the system bus is available at the beginning of a clock cycle.

Figure 2:
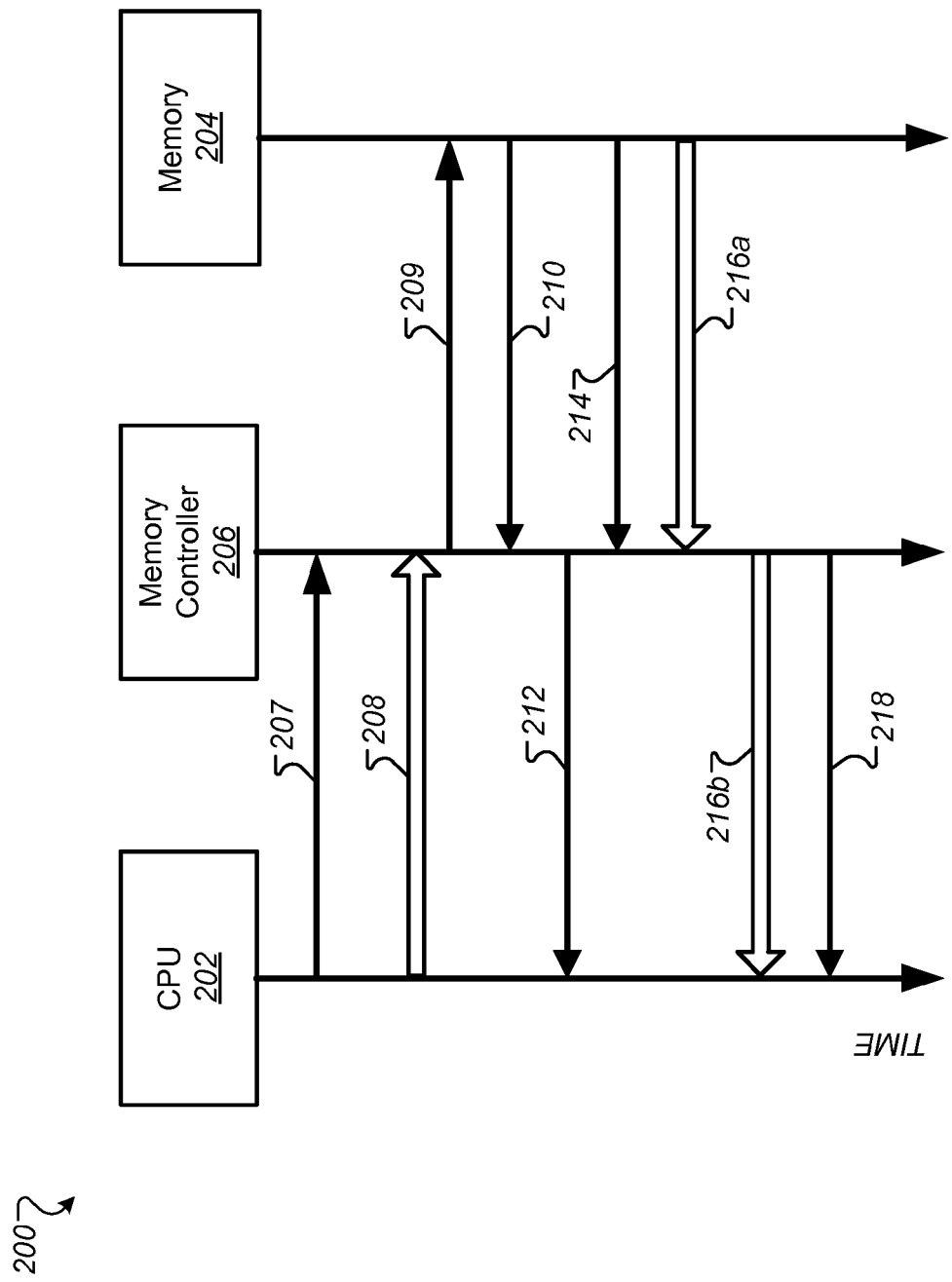
FIG. 2 is a timing diagram illustrating an example of a signal exchange among a microcontroller CPU, a microcontroller memory and the memory controller.

FIG. 2 is a timing diagram 200 illustrating an example of a signal exchange among a microcontroller CPU, a microcontroller memory and the memory controller. The timing diagram 200 shows a CPU 202, memory 204 and memory controller 206. Read enable signal 207, memory address 208, memory access signal 209, latch delay signals 210 and 214, data 216a and 216b, and system bus data ready signals 212 and 218 are exchanged among the CPU 202, the memory 204 and the memory controller 206. Time is indicated by downward arrows, that is, a signal that is vertically above another signal is temporally preceding the latter.

The CPU 202 may be similar to the CPU 102, while the memory 204 may be similar to the memory 104 and the memory controller 206 may be similar to the memory controller 106. When the CPU 202 wants to read from the memory 204 data corresponding to an application stored in the memory 204, the CPU 202 sets a read enable signal 207, for example, to a high level. When the read enable signal 207 is set, the CPU 202 makes a memory address available on the address bus, which is indicated by 208. The memory address 208 provides the address of the location in the memory 204 where the requested data is stored. The read enable signal 207 and the requested memory address 208 may together be considered to represent a read request signal.

When the read enable signal 207 is set to the high level by the CPU 202, the memory controller 206 reads the memory address 208 from the address bus and accordingly accesses the corresponding memory location in the memory 204. Memory access signal 209 represents the access performed by the memory controller 206 that includes the memory address indicated by 208.

While the memory controller 206 accesses the memory 204, the memory 204 sets the latch delay signal 210 to a first state (for example, low level), indicating that the physical memory is being accessed.

When the state of the latch delay signal 210 is set to the first state, the memory controller 206 sets the system bus data ready signal 212 on the system bus to a first state (for example, low level), which indicates that the requested memory access is being performed, and the data is not yet available on the system bus.

When the physical memory access is completed, the memory 204 signals the memory controller 206 by setting the latch delay signal 214 to a second state, (for example, high level). Accordingly, the data can be read from the memory 204, which is indicated by 216a.

The memory controller 206 ensures that the data received from the memory 204 is available on the system bus as the data 216b. In some implementations, the memory controller 206 captures the latch delay signal 214 at the start of the first state of the system bus clock signal. In some implementations, upon reading the state of the captured latch delay signal 214 as the second state, the memory controller 206 waits for the following start of the first state of the system bus clock signal before setting the system bus data ready signal 218 to a second state (for example, high level), which indicates to the CPU 202 that the requested data is available on the system bus.

When the CPU reads the state of the system bus data ready signal 218 as set to the second state, the CPU 202 can access the requested data from the system bus.

In some implementations, the data 216b is made available on the system bus before the latch delay signal 218 is set to the second state, while in some other implementations; the two operations are performed in the reverse order. In some implementations, the two operations are performed concurrently.

Figure 3:
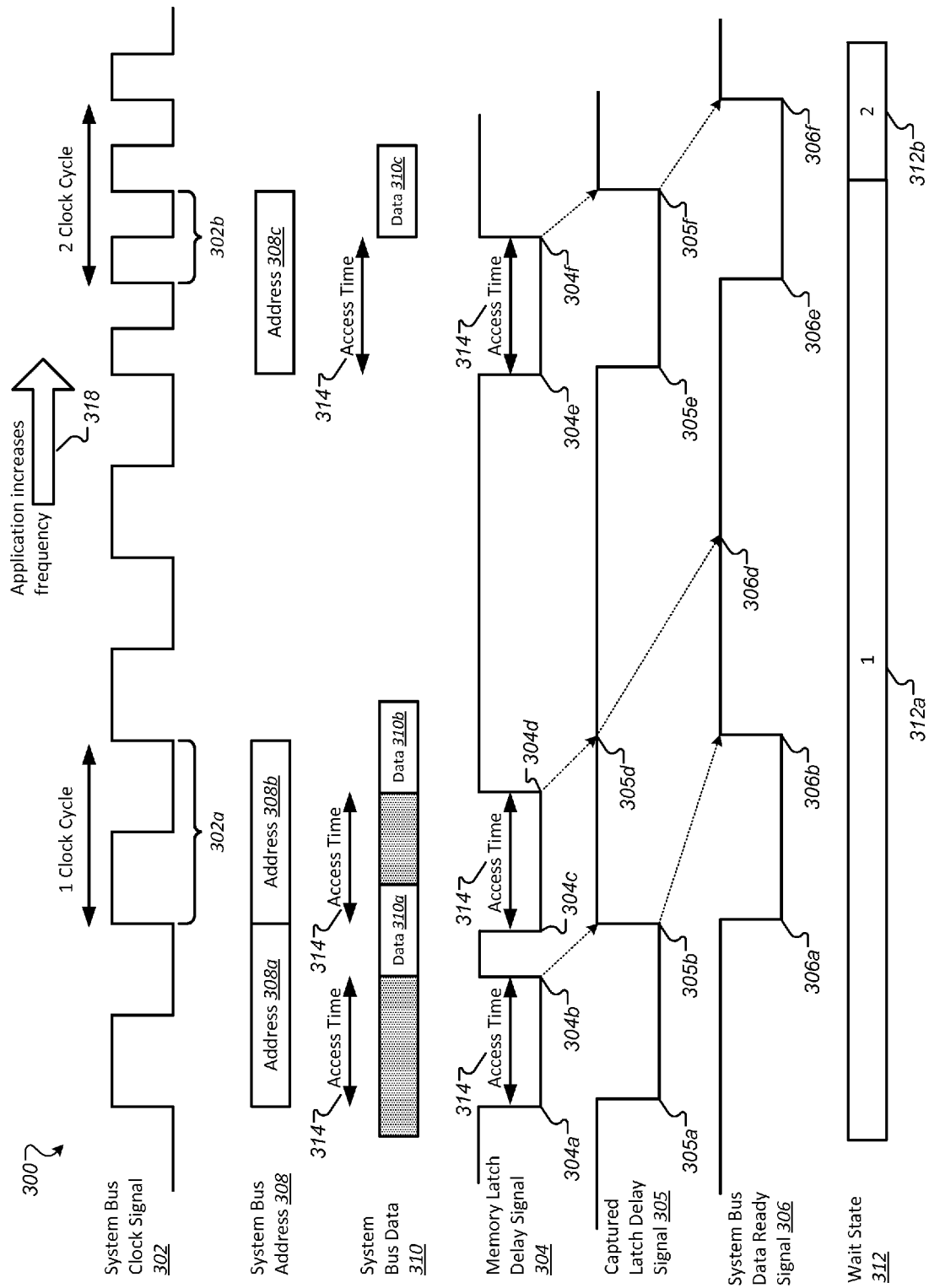
FIG. 3 illustrates an example of signal flow in a microcontroller for automatic wait state management.

FIG. 3 illustrates an example of signal flow 300 in a microcontroller for automatic wait state management. For example, the signals shown in FIG. 3 may be implemented in the microcontroller 100 to manage the wait states of the CPU 102 for accessing the memory 104. Accordingly, the following section describes the signal flow 300 as being performed by components of the microcontroller 100. However, the signal flow 300 may be performed by other devices, circuits or systems.

The signal flow 300 includes the system bus clock signal 302, the memory latch delay signal 304, the captured latch delay signal 305 and the system bus data ready signal 306. Memory addresses for requested memory access are shown by system bus address 308, while the corresponding data returned by the memory are indicated by system bus data 310. The CPU wait state for accessing the memory is indicated by wait state 312. The captured latch delay signal 305 is similar to the latch delay signal 214, while the system bus data ready signal 306 is similar to the data ready signal 218.

Initially, the frequency of the CPU 102 is set at a value that allows an access of the memory to be performed within one clock cycle, that is, the number of the wait state is 1. For example, the initial duration of the CPU frequency, which is given by one clock cycle, is indicated by 302a. The CPU 102 makes memory read requests to read data from the memory 104 at a time when the CPU frequency is given by 302a. The locations in the memory 104 where the data is stored are given by addresses 308a and 308b. As described previously, the CPU 102 makes a memory read request by setting the read enable signal to a high level, and making a memory address corresponding to the memory read request (for example, address 308a or 308b) available on the system bus.

Based on the CPU memory read requests, the memory controller 106 accesses the respective locations in the memory 104. The access time for reading the memory is a finite non-zero number, which is indicated by 314. As described previously, the access time 314 may vary, for example based on operating conditions.

When the memory controller 106 performs the first memory access based on the first requested address 308a, the memory 104 sets the memory latch delay signal 304 to a first state (for example, low level), which is indicated by 304a. The memory latch delay signal 304 is held in the first state for a time duration that is the same as the access time 314. The memory controller 106 reads the memory latch delay signal 304 as the captured latch delay signal 305. Upon reading the state of the memory latch delay signal 304 as the first state at 304a, the memory controller 106 sets the state of the captured latch delay signal 305 to the first state at 305a. In this context, the memory latch delay signal 304 is the latch delay signal that is internally generated by the memory 104, while the captured latch delay signal 305 is the latch delay signal that is determined by the memory controller 106 upon reading the memory latch delay signal 304.

In some implementations, after setting the captured latch delay signal 305 to the first state at 305a, the memory controller 106 waits for a period of time before setting the system bus data ready signal 306 to a first state (for example, also a low level), at 306a. As described previously, in some implementations the memory controller 106 waits for a full cycle of the system bus clock to allow for any instability in the system to settle.

When internal circuitry of the memory 104 completes accessing the memory location corresponding to address 308, such that the data 310a stored in the accessed memory location is available, the memory 104 sets the memory latch delay signal 304 to a second state (for example, high level), which is indicated by 304b. In some implementations, upon determining that the memory latch delay signal 304 is set to the second state, the memory controller 106 waits until the system bus clock signal is in the second state, and then sets the captured latch delay signal 305 to the second state at 305b. In some implementations, the memory controller 106 makes the data 310a available on the system bus, but waits for a complete cycle of the system bus clock signal 302 before indicating to the CPU that the data is available.

With the captured latch delay signal 305 in the second state, the memory controller 106 determines when the system bus clock signal 302 makes a transition from the first state to the second state. At that time or soon thereafter, the memory controller 106 sets the system bus data ready signal 306 to a second state (for example, also a high level) at 306b, indicating to the CPU 102 that the data 310a is available on the system bus. As shown in FIG. 3, the transition of the memory latch delay signal 304 between the first and second states is based on accesses to the memory. However, in some implementations, the memory controller 106 makes the corresponding transitions of the captured latch delay signal 305 between the first and second states only at the beginning of a cycle of the system bus clock signal 302, for example when the system bus clock signal makes a transition from the first state to the second state, or when the system bus clock signal is in the second state. For these reasons, when the memory latch delay signal 304 makes a transition from the first state to the second state at 304b, the memory controller 106 waits until the system bus clock signal transitions from the first state to the second state before transitioning the captured latch delay signal 305 from the first state to the second state at 305b.

Similarly, in some implementations, the memory controller 106 makes a transition of the system bus data ready signal 306 from the first state to the second state at the beginning of a cycle of the system bus clock signal 302, for example when the system bus clock signal makes a transition from the first state to the second state, or when the system bus clock signal is in the second state.

The access time corresponding to the address 308a is less than one clock cycle 302a. Therefore, as indicated by 312a, the number of the wait state for the CPU 102 is 1, that is, memory read requests from the CPU 102 might be made in consecutive clock cycles. Consequently, the memory controller 106 commences the second memory access corresponding to the address 308b at the next clock cycle, based on when the memory latch delay signal is set to the first state by the memory 104, as indicated by 304c. As shown, the time duration of the first state of the memory latch delay signal 304 is same as the access time 314. When the data 310b corresponding to memory address 308b is ready for the CPU, the memory 104 sets the memory latch delay signal to the second state at 304d.

When the memory latch delay signal 304 transitions at 304c, the memory controller 106 maintains the captured latch delay signal 305 in its current state (for example, second state) till the beginning of the next full cycle of the system bus clock. However, by the time the next full cycle of the system bus clock commences, the memory latch delay signal 304 has transitioned back to the second state (for example, at 304d), and accordingly the memory controller 106 keeps the captured latch delay signal 305 in the second state at 305d.

Similar to the situation for address 308a, the access time 314 for memory access corresponding to address 308b is less than one clock cycle 302a. Therefore, the number of the wait state for the CPU is 1, which is indicated by 312a.

As shown above, there is a finite delay, or margin, between the time the captured latch delay signal 305 is set to the second state at 305b and the time the system bus data ready signal 306 is set to the second state at 306b. The margin is configured to prevent the system bus data ready signal 302 from oscillating between first and second states, which may otherwise be the case if the state of the captured latch delay signal changes rapidly based on the successive frequent memory read requests from the CPU. As described above, in some implementations the margin is composed of two parts—a first part to synchronize the latch delay signal to the system clock, and then an additional delay (second part) equivalent to a full cycle of the system bus block signal, which allows for any instability in the system to settle.

In some implementations, the memory latch delay signal 304 is fully asynchronous to the rest of microcontroller system. However, by comparing the state of the memory latch delay signal 304 with the state of the system bus clock 302, the memory controller 106 achieves synchronization of the captured latch delay signal 305. In some implementations, the memory controller 106 limits the time taken to compare the state of the memory latch delay signal 304 or the captured latch delay signal 305, or both, with the state of the system bus clock signal 302 so that the synchronization mechanism is efficient in terms of the microcontroller system latency.

At a time indicated by 318, an application that is executed by the CPU 102 increases the system clock frequency, that is, the CPU frequency. At this time, the duration of the CPU frequency is indicated by 302b, which is less than 302a. The updated value of the CPU frequency is such that an access of the memory may be performed within two clock cycles. Therefore, the number of the wait state for the CPU changes to 2, which is indicated by 312b.

At this time, the CPU 102 makes a memory read request to read data that is stored in a location in the memory 104 given by the address 308c. Based on the CPU memory read request, the memory controller 106 accesses the respective location in the memory 104.

In a manner similar to the preceding description, when the memory controller 106 accesses the memory 104 location corresponding to the requested address 308c, the memory 104 sets the memory latch delay signal 304 to the first state at 304e. Upon determining that the latch delay signal is set to the first state, the memory controller 106 sets the captured latch delay signal 305 to the first state at 305e (when the system bus clock signal is in the second state), and accordingly sets the system bus data ready signal 306 to the first state at the beginning of the next full cycle of the system bus clock, at 306e.

When the data 310c corresponding to the memory address 308c is available, the memory 104 sets the memory latch delay signal 304 to the second state at 304f. Upon determining that the memory latch delay signal 304 is set to the second state, the memory controller 106 waits until the system bus clock signal transitions from the first state to the second state, at which time the memory controller 106 sets the captured latch delay signal 305 to the second state, at 305f. The memory controller 106 waits a finite time duration (for example, a full cycle of the system bus clock signal 302) to provide a safety margin as discussed previously, and sets the system bus data ready signal 306 to the second state at 306f at the completion of the time duration.

The access time 314 for reading the memory may generally vary. The time taken to access the memory location may be longer than one clock cycle when the CPU frequency is increased. Therefore, the CPU 102 cannot read from the memory 104 in consecutive clock cycles, unlike the case when memory addresses 308a and 308b were requested. In this example, since the access time is less than two clock cycles, the CPU 102 may read from the memory in every two clock cycles. Using the captured latch delay signal 305 or the memory latch delay signal 304, or both, to configure the system bus data ready signal 306 makes it possible to adjust automatically the rate at which the CPU 102 may read from the memory 104.

In traditional systems, the latch delay signal (either the memory latch delay signal or the captured latch delay signal) is not used to configure the system bus data ready signal. In such systems, the rate at which the CPU reads from the memory is based on the value of the number of wait states specified in the wait state configuration register. Since the value specified in the wait state configuration register is a fixed value, the rate at which the CPU may read from the memory remains fixed and does not change with the changes in the application or in the CPU frequency. For example, if the value of the number of wait states specified in the wait state configuration register is 2, then the CPU may be configured to access the memory every two clock cycles, for all the memory accesses. Such a case may be inefficient, since even if the CPU frequency is slow enough such that the CPU may read from the memory in every clock cycle (wait state being 1), the CPU would still have to wait for every two clock cycles due to the fixed value of 2 for the number of the wait state, as specified in the wait state configuration register.

With the automatic wait state management described above, the user application may change dynamically the system clock frequency without reconfiguring the memory. For similar reasons, with the automatic wait state management, other conditions associated with the user application, such as temperature, voltage or process deviation, may change dynamically without the memory being reconfigured such that the CPU accesses of the memory are correctly timed.

Figure 4:
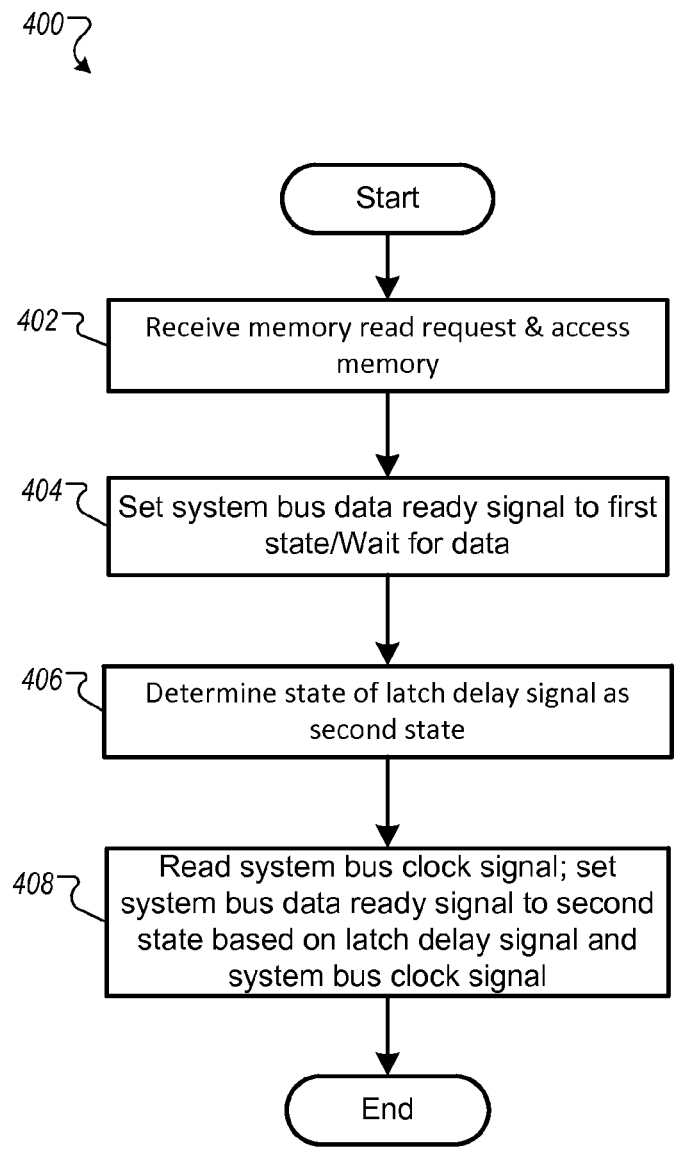
FIG. 4 is a flow chart illustrating an example of a process for automatically managing the wait state of a CPU.

FIG. 4 is a flow chart illustrating an example of a process 400 for automatically managing the wait state of a CPU to read from a memory. The process 400 may be performed by a memory controller, such as memory controller 106 coupled to the memory 104. Accordingly, the following section describes the process 400 as being performed by components of the microcontroller 100. However, the process 400 may be performed by other devices, circuits, systems or system configurations.

The process 400 commences when a memory read request is received and the memory is accessed (402). For example, the memory controller 106 may receive a read enable signal with value set to a high level by the CPU 102 for reading user application data that is stored in the memory 104. When the read enable signal set to a high level, an address of a memory location where the data is stored is made available on the address bus by the CPU. Upon determining that the read enable signal is set to the high level, the memory controller 106 reads the memory address from the address bus and signals the memory 104 for reading the data stored in the memory location corresponding to the memory address.

The memory controller sets the system bus data ready signal to a first state and waits for data (404). For example, when the memory controller 106 signals the memory 104 for reading the data stored in the memory location corresponding to the memory address included in the read request, the memory 104 sets the memory latch delay signal to the first state (for example, low level). The memory latch delay signal is read by the memory controller 106, which therefore determines that the memory 104 has set the memory latch delay signal to the first state. The first state of the memory latch delay signal indicates to the memory controller 106 that internal circuitry in the memory 104 is busy identifying the memory location based on the memory address, and retrieving the stored data from the identified memory location.

Upon determining that the memory latch delay signal is set to the first state by the memory 104, the memory controller 106 sets the captured latch delay signal to the first state after synchronizing with the system bus clock, as described previously. The memory controller 106 waits a finite time duration (for example, for the start of the next cycle of the system bus clock) and then sets the system bus data ready signal to a first state (for example, also low level). The system bus data ready signal is read by the CPU 102. The first state of the system bus data ready signal indicates to the CPU 102 that the requested memory read operation is being performed, and that data is not yet available on the system bus. The CPU 102 is in a wait state, in which it waits for the current read operation to be completed before the next memory read may be performed.

The memory controller determines the state of the latch delay signal as a second state (406). For example, when the internal circuitry in the memory 104 completes identifying the memory location and retrieving the stored data from the identified memory location, the memory 104 sets the memory latch delay signal to a second state (for example, high level). The second state of the memory latch delay signal indicates that the memory 104 is ready for performing the next memory access operation. Upon reading the memory latch delay signal, the memory controller 106 determines that the memory latch delay signal has been set to the second state by the memory 104, and therefore the data corresponding to the requested memory address is available. The memory controller 106 sets the captured latch delay signal to the second state based on synchronizing with the system bus clock, as described previously.

The memory controller 106 reads the system bus clock signal and sets the system bus data ready signal to a second state based on the latch delay signal and the system bus clock signal (408). For example, after setting the captured latch delay signal to the second state, the memory controller 106 waits a finite time duration (for example, for a complete cycle of the system bus clock). When the system bus clock signal transitions from the first state to the second state at the start of the next clock cycle, the memory controller 106 sets the system bus data ready signal to a second state (for example, also high level).

The delay due to the memory controller 106 waiting for the finite time duration before setting the system bus data ready signal to the second state prevents the system bus data ready signal from oscillating between first and second states, for example, if the state of the latch delay signal changes rapidly based on the successive memory read requests from the CPU 102. The second state of the system bus data ready signal informs the CPU 102 that the data corresponding to the requested memory read operation is available on the system bus.

Upon determining that the latch delay signal is in the second state, the memory controller 106 may proceed with a new memory access operation, based on a new memory read request from the CPU 102 that is subsequent to the read request just completed, such as a read request for address 308*b* that follows the read request for address 308*a*. The new memory read request may be queued in the system bus while the memory 104 was being accessed for the previous read request.

Therefore, using the process 400, the rate at which the microcontroller memory is accessed may be managed, which is based on the latch delay signal. By using the latch delay signal, the process 400 is independent of any stored wait state value that may be stored in the system. When the CPU frequency changes, the wait state of the CPU is automatically updated by managing the system bus data ready signal based on the latch delay signal and the system bus clock.

The implementations described in the preceding sections for managing the wait state automatically is transparent to the user application. The user may change various conditions of the application, or the CPU frequency, or both. The microcontroller will automatically use the most efficient number of wait states for the CPU to access the memory. In some cases, this may make it easier to use the microcontroller since the user does not have to configure manually a value of the wait state.

The implementations described above also allow independence of the internal settings of the microcontroller from the user-configured external settings. In some cases, automatic management of the wait state offers microcontroller performance improvement since the margin between worst-case conditions and actual conditions is shrunk.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method comprising:
   receiving a first edge of a latch signal from a non-volatile memory device that indicates a start of a memory access performed by the non-volatile memory device;
   receiving a first edge of a system bus clock signal that corresponds to a start of a first cycle of the system bus clock;
   based on the first edge of the latch signal and the first edge of the system bus clock signal, setting a latch delay signal to a first state;
   conditioned on the latch delay signal being in the first state, setting a system bus data ready signal to the first state to indicate an initiation of a wait state for a central processing unit (CPU), wherein the wait state is associated with reading data from the non-volatile memory device, and wherein the latch delay signal is distinct from the system bus data ready signal;
   receiving a second edge of the latch signal from the non-volatile memory device that indicates that data is available; and
   based on the second edge of the latch signal and the system bus clock signal, setting the system bus data ready signal to a second state to indicate completion of the wait state for the CPU.

2. The method of claim 1, wherein receiving a latch signal includes receiving the latch signal from the non-volatile memory device, and wherein the first edge of the latch signal is indicative of a start time for processing a request for data and the second edge of the latch signal is indicative of an end to the processing of the request and data being available responsive to the request.

3. The method of claim 1, wherein the system bus clock signal is received from the CPU and wherein the system bus clock signal varies over time depending on an application executed by the CPU.

4. The method of claim 1, wherein receiving the first edge or the second edge of the latch signal includes:
   evaluating a data ready edge of the latch signal; and
   adjusting the wait state based on the evaluation, including automatically increasing or decreasing the wait state and delaying or accelerating a triggering of the system bus data ready signal depending on a current access time associated with the non-volatile memory device.

5. The method of claim 4, wherein the system bus clock signal varies over time depending on an application executed by the CPU and wherein the wait state adjustment is independent of frequency of the system bus clock signal.

6. The method of claim 1, wherein setting the system bus data ready signal includes triggering the system bus data ready signal a finite amount of time after receipt of a data ready edge of the latch signal.

7. The method of claim 6, wherein the finite amount of time is based on the system bus clock signal, the system bus data ready signal triggered after elapse of a complete cycle of the system bus clock signal subsequent to the receipt of the data ready edge of the latch signal.

8. The method of claim 1, wherein the latch signal represents an amount of time used to access physical memory locations in the non-volatile memory device responsive to a request for data.

9. The method of claim 1, comprising synchronizing the latch signal to the system bus clock signal.

10. The method of claim 1, wherein setting the system bus data ready signal to the first state conditioned on the latch delay signal being in the first state comprises:
receiving a leading edge of a next cycle of the system bus clock signal after the first cycle of the system bus clock signal; and
in response to receiving the leading edge of the next cycle of the system bus clock signal after the first cycle of the system bus clock signal when the latch delay signal is in the first state, setting the system bus data ready signal to the first state.

11. The method of claim 10, wherein setting the system bus data ready signal to the second state based on the second edge of the latch signal and the system bus clock signal comprises:
receiving a second edge of the system bus clock signal that corresponds to a start of a second cycle of the system bus clock; and
changing the latch delay signal from the first state to the second state based on receiving the second edge of the latch signal and the second edge of the system bus clock signal.

12. The method of claim 11, further comprising:
receiving a leading edge of a next cycle of the system bus clock signal after the second cycle of the system bus clock signal; and
in response to receiving the leading edge of the next cycle of the system bus clock signal after the second cycle of the system bus clock signal when the latch delay signal is in the second state, setting the system bus data ready signal to the second state.

13. The method of claim 8, wherein the amount of time used to access the physical memory locations in the non-volatile memory device depends on one or more of temperature, voltage, memory semiconductor material, process deviation or frequency of memory access.

14. A system comprising:
a storage medium storing first logic that, when executed, is operable to cause a processor to:
determine a current access time associated with a non-volatile memory device, wherein access time defines an amount of time used by the non-volatile memory device to make data available responsive to a request for data;
generate a latch signal that is indicative of the current access time; and
provide the latch signal to a non-volatile memory device controller; and a storage medium storing second logic that, when executed, is operable to cause the non-volatile memory device controller to:
receive a first edge of the latch signal from the non-volatile memory device that indicates start of a memory access performed by the non-volatile memory device;
receive a first edge of a system bus clock signal that corresponds to a start of a first cycle of the system bus clock;
based on the first edge of the latch signal and the first edge of the system bus clock signal, set a latch delay signal to a first state;
conditioned on the latch delay signal being in the first state, set a system bus data ready signal to a first state to indicate an initiation of a wait state for a central processing unit (CPU), wherein the wait state is associated with reading data from the non-volatile memory device, and wherein the latch delay signal is distinct from the system bus data ready signal;
receive a second edge of the latch signal from the non-volatile memory device that indicates that data is available; and
based on the second edge of the latch signal and the system bus clock signal, set the system bus data ready signal to a second state to indicate completion of the wait state for the CPU to read data.

15. The system of claim 14, wherein the second logic that is operable to cause the non-volatile memory device controller to receive the system bus clock signal includes logic that is operable to:
synchronize the latch signal to the system bus clock signal.

16. The system of claim 14, wherein the system bus clock signal is received from the CPU and wherein the system bus clock signal varies over time depending on an application executed by the CPU.

17. The system of claim 14, wherein the second logic that is operable to cause the non-volatile memory device controller to receive the first edge of the latch signal includes logic operable to:
evaluate a data ready edge of the latch signal; and
adjust the wait state based on the evaluation, including automatically increase or decrease the wait state and delay or accelerate a triggering of the system bus data ready signal depending on a current access time associated with the non-volatile memory device.

18. The system of claim 17, wherein the system bus clock signal varies over time depending on an application executed by the CPU and wherein the wait state adjustment is independent of frequency of the system bus clock signal.

19. The system of claim 14, wherein the second logic that is operable to cause the non-volatile memory device controller to set the system bus data ready signal includes logic operable to trigger the system bus data ready signal a finite amount of time after receipt of a data ready edge of the latch signal.

20. The system of claim 19, wherein the finite amount of time is based on the system bus clock signal, the system bus data ready signal triggered after elapse of a complete cycle of the system bus clock signal subsequent to the receipt of the data ready edge of the latch signal.

21. The system of claim 14, wherein the latch signal represents an amount of time used to access physical memory locations in the non-volatile memory device responsive to a request for data.

22. The system of claim 14, wherein the second logic is operable to cause the non-volatile memory device controller to:
synchronize a leading edge of the latch signal to the system bus clock signal.

23. The system of claim 14, wherein setting the system bus data ready signal to the first state conditioned on the latch delay signal being in the first state comprises:
receive a leading edge of a next cycle of the system bus clock signal after the first cycle of the system bus clock signal; and
in response to receiving the leading edge of the next cycle of the system bus clock signal after the first cycle of the system bus clock signal when the latch delay signal is in the first state, setting the system bus data ready signal to the first state.

24. The system of claim 23, wherein setting the system bus data ready signal to the second state based on the second edge of the latch signal and the system bus clock signal comprises:
receiving a second edge of the system bus clock signal that corresponds to a start of a second cycle of the system bus clock; and changing the latch delay signal from the first state to the second state based on receiving the second edge of the latch signal and the second edge of the system bus clock signal.

25. The system of claim 24, wherein the second logic is operable to cause the non-volatile memory device controller to:
receive a leading edge of a next cycle of the system bus clock signal after the second cycle of the system bus clock signal; and
in response to receiving the leading edge of the next cycle of the system bus clock signal after the second cycle of the system bus clock signal when the latch delay signal is in the second state, set the system bus data ready signal to the second state.

26. The system of claim 21, wherein the amount of time used to access the physical memory locations in the non-volatile memory device depends on one or more of temperature, voltage, memory semiconductor material, process deviation or frequency of memory access.

* * * * *